United States Patent
Wang et al.

(10) Patent No.: US 12,101,250 B2
(45) Date of Patent: Sep. 24, 2024

(54) METHODS AND APPARATUS FOR ROUTING CONTROL IN A CLOUD NETWORK

(71) Applicant: Tencent Technology (Shenzhen) Company Limited, Shenzhen (CN)

(72) Inventors: Lei Wang, Shenzhen (CN); Ruilong Chen, Shenzhen (CN); Qunli Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/735,001

(22) Filed: May 2, 2022

(65) Prior Publication Data
US 2022/0263756 A1 Aug. 18, 2022

Related U.S. Application Data

(63) Continuation of application No. PCT/CN2020/122102, filed on Oct. 20, 2020.

(30) Foreign Application Priority Data

Jan. 13, 2020 (CN) .......................... 202010031982.6

(51) Int. Cl.
*H04L 45/44* (2022.01)
*H04L 45/00* (2022.01)

(52) U.S. Cl.
CPC .............. *H04L 45/44* (2013.01); *H04L 45/22* (2013.01)

(58) Field of Classification Search
CPC ....... H04L 45/44; H04L 45/22; H04L 45/745; H04L 67/61
See application file for complete search history.

(56) References Cited

U.S. PATENT DOCUMENTS 7,636,764 B1 * 12/2009 Fein .................. H04L 67/63
709/212
9,832,128 B1 * 11/2017 Ashner ............... H04L 67/141
(Continued)

FOREIGN PATENT DOCUMENTS

CN 104158739 A 11/2014
CN 104954219 A 9/2015
(Continued)

OTHER PUBLICATIONS

Extended European Search Report and Supplementary Search Report, EP20914645.5, Sep. 15, 2022, 14 pgs.
(Continued)

*Primary Examiner* — Jimmy H Tran
(74) *Attorney, Agent, or Firm* — Morgan, Lewis & Bockius LLP

(57) ABSTRACT

A routing control method is performed by a computer device acting as an intelligent routing server in an accelerated cloud network, the method including: receiving a routing query request sent by one forwarding node in the accelerated cloud network, the routing query request being generated by the forwarding node according to an access request for a target node by a terminal device; obtaining path information of a forwarding path according to state information of forwarding nodes in the accelerated cloud network, the forwarding path being used to forward the access request in the accelerated cloud network; and transmitting the path information to the forwarding node, wherein the forwarding node is configured to forward the access request to the target node according to the path information.

12 Claims, 8 Drawing Sheets

(56) References Cited

U.S. PATENT DOCUMENTS

| | | | |
|---|---|---|---|
| 10,110,668 B1* | 10/2018 | Sharma | H04L 45/74591 |
| 11,470,535 B1* | 10/2022 | Thomason | H04L 67/02 |
| 2006/0168334 A1* | 7/2006 | Potti | H04L 67/02 709/227 |
| 2010/0223378 A1* | 9/2010 | Wei | H04L 47/822 709/224 |
| 2010/0284269 A1* | 11/2010 | Zhu | G06F 11/0757 370/221 |
| 2011/0261696 A1* | 10/2011 | Crisan | H04L 45/127 370/235 |
| 2012/0320920 A1* | 12/2012 | Akiyoshi | H04L 45/74 370/392 |
| 2014/0108665 A1* | 4/2014 | Arora | H04L 67/563 709/227 |
| 2014/0330985 A1* | 11/2014 | Wong | H04L 45/021 709/242 |
| 2015/0052247 A1* | 2/2015 | Threefoot | H04L 67/10 709/225 |
| 2015/0078169 A1* | 3/2015 | Sonoda | H04L 43/20 370/236 |
| 2015/0271102 A1* | 9/2015 | Antich | H04L 47/805 370/230 |
| 2016/0094398 A1* | 3/2016 | Choudhury | H04L 45/42 370/254 |
| 2017/0230451 A1* | 8/2017 | Paramasivam | G06F 16/24573 |
| 2017/0310596 A1* | 10/2017 | Sankar | H04L 67/1012 |
| 2017/0359261 A1* | 12/2017 | Avci | H04L 45/70 |
| 2018/0173557 A1* | 6/2018 | Nakil | H04L 41/0631 |
| 2018/0255060 A1* | 9/2018 | Bansal | H04L 67/51 |
| 2018/0359311 A1* | 12/2018 | Paramasivam | H04L 67/025 |
| 2019/0104413 A1* | 4/2019 | Cidon | H04L 12/4625 |
| 2019/0190729 A1* | 6/2019 | Levy-Abegnoli | H04L 12/185 |
| 2019/0199626 A1* | 6/2019 | Thubert | H04L 45/64 |
| 2019/0238449 A1* | 8/2019 | Michael | H04L 45/123 |
| 2019/0253354 A1* | 8/2019 | Caulfield | H04L 47/12 |
| 2020/0287806 A1* | 9/2020 | Kulshreshtha | H04L 43/04 |
| 2020/0328977 A1* | 10/2020 | Pfister | H04L 67/5681 |
| 2020/0349098 A1* | 11/2020 | Caulfield | G06F 9/505 |
| 2020/0366592 A1* | 11/2020 | Ehrat | H04L 45/14 |
| 2021/0119940 A1* | 4/2021 | Kumar | H04L 45/28 |
| 2021/0168125 A1* | 6/2021 | Vemulpali | G06F 9/45533 |
| 2021/0320853 A1* | 10/2021 | Kulshreshtha | H04L 41/145 |
| 2021/0377210 A1* | 12/2021 | Singh | G06F 21/73 |
| 2022/0006726 A1* | 1/2022 | Michael | H04L 43/0876 |
| 2022/0337506 A1* | 10/2022 | Zhu | H04L 43/0852 |
| 2022/0400166 A1* | 12/2022 | Branch | H04L 47/283 |
| 2023/0029079 A1* | 1/2023 | Vemulpali | H04L 61/103 |
| 2023/0048749 A1* | 2/2023 | Zhuang | H04L 45/64 |
| 2023/0134974 A1* | 5/2023 | Ehrat | H04L 45/28 709/238 |
| 2023/0318991 A1* | 10/2023 | Kumar | H04L 49/252 718/1 |

FOREIGN PATENT DOCUMENTS

| | | |
|---|---|---|
| CN | 105704034 A | 6/2016 |
| CN | 108023812 A | 5/2018 |
| CN | 109547966 A | 3/2019 |
| CN | 109787868 A | 5/2019 |
| CN | 109995653 A | 7/2019 |
| CN | 111277630 A | 6/2020 |
| JP | 2004129156 A | 4/2004 |
| JP | 2008135914 A | 6/2008 |
| JP | 2012222461 A | 11/2012 |
| WO | WO 2011083846 A1 | 7/2011 |
| WO | WO 2016078071 A1 | 5/2016 |

OTHER PUBLICATIONS

Tencent Technology, Japanese Office Action, JP Patent Application No. 2022-517155, Apr. 4, 2023, 5 pgs.

Tencent Technology, WO, PCT/CN2020/122102, Jan. 22, 2021, 5 pgs.

Tencent Technology, IPRP, PCT/CN2020/122102, Jul. 19, 2022, 6 pgs.

Tencent Technology, ISR, PCT/CN2020/122102, Jan. 22, 2021, 3 pgs.

Tencent Technology, European Office Action, EP Patent Application No. 20914645.5, Jul. 13, 2023, 5 pgs.

Tencent Technology, European Office Action, EP Patent Application No. 20914645.5, Nov. 29, 2023, 7 pgs.

* cited by examiner

METHODS AND APPARATUS FOR ROUTING CONTROL IN A CLOUD NETWORK

CROSS-REFERENCE TO RELATED APPLICATIONS

This application is a continuation application of PCT Patent Application No. PCT/CN2020/122102, entitled "ROUTING CONTROL METHOD AND APPARATUS, ELECTRONIC DEVICE, AND STORAGE MEDIUM" filed on Oct. 20, 2020, which claims priority to Chinese Patent Application No. 202010031982.6, filed with the State Intellectual Property Office of the People's Republic of China on Jan. 13, 2020, and entitled "ROUTING CONTROL METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and in particular, to a routing control method and apparatus, an electronic device, and a storage medium.

BACKGROUND OF THE DISCLOSURE

In a conventional static routing configuration solution, for a specified domain name of an origin station, a forwarding path for accessing the domain name is determined according to experimental or statistical information, and routing information of all nodes on the path is correspondingly configured, so that each node forwards all requests for accessing the domain name to a next-hop node on the path. Subsequently, routing information of all requests for accessing the domain name is exactly the same and no longer changes. As a result, it is difficult to effectively handle accidents that occur in real time in a network, restricting availability of an accelerated cloud network and reducing access request processing efficiency.

SUMMARY

A routing control method is performed by a computer device acting as an intelligent routing server in an accelerated cloud network, where the method includes:

receiving a routing query request sent by one forwarding node in the accelerated cloud network, where the routing query request is generated by the forwarding node according to an access request for a target node by a terminal device;

obtaining path information of a forwarding path according to state information of forwarding nodes in the accelerated cloud network, where the forwarding path is used to forward the access request in the accelerated cloud network; and transmitting the path information to the forwarding node, so that the forwarding node forwards the access request to the target node according to the path information.

In some embodiments, the path information of the first forwarding path is determined by the intelligent routing server according to state information of forwarding nodes in the accelerated cloud network and state information of a node outside the accelerated cloud network.

In some embodiments, the method further includes:

probing another forwarding node in the accelerated cloud network, to determine the state information of the forwarding nodes, and reporting the state information of the forwarding nodes to the intelligent routing server, so that the intelligent routing server determines a first network distance between each two of the forwarding nodes according to the state information of the forwarding nodes; and probing the node outside the accelerated cloud network, to determine state information of the node outside the accelerated cloud network, and reporting the state information of the node outside the accelerated cloud network to the intelligent routing server, so that the intelligent routing server determines a second network distance between the forwarding node and the node outside the accelerated cloud network according to the state information of the forwarding nodes and the state information of the node outside the accelerated cloud network.

In some embodiments, the routing table further includes a second network distance between the forwarding node and a node outside the accelerated cloud network, and the second network distance is determined according to state information of the forwarding node and state information of the node outside the accelerated cloud network.

In some embodiments, state information of forwarding nodes is reported by each of the forwarding nodes after probing another forwarding node; and the state information of the node outside the accelerated cloud network is reported by each of the forwarding nodes after probing the node outside the accelerated cloud network.

A non-transitory computer-readable storage medium is provided for storing computer-executable instructions, where the computer-executable instructions, when executed by one or more processors of a computer device, cause the computer device to perform operations of the foregoing routing control method.

A computer device is provided, including a memory and one or more processors, where the memory stores computer-executable instructions, and the computer-executable instructions, when executed by the one or more processors, cause the computer device to perform operations of the foregoing routing control method.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person skilled in the art may still derive other accompanying drawings from these accompanying drawings without creative efforts.

The accompanying drawings described herein are used for providing a further understanding of this application, and form part of this application. Exemplary embodiments of this application and descriptions thereof are used for explaining this application, and do not constitute any inappropriate limitation to this application.

DESCRIPTION OF EMBODIMENTS

Figure 1:
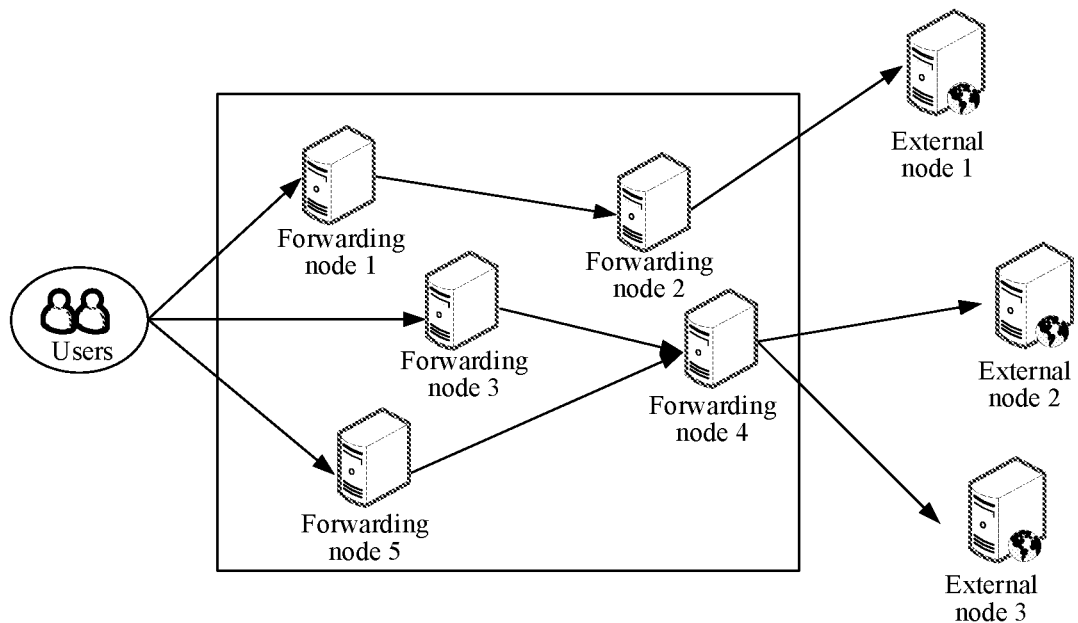
FIG. 1 is a schematic diagram of a principle of a static routing configuration solution according to an embodiment of this application.

To make the objectives, technical solutions, and advantages of the embodiments of this application clearer, the technical solutions in this application will be clearly and completely described in the following with reference to the accompanying drawings in the embodiments of this application. Apparently, the described embodiments are merely a part rather than all of the embodiments of the technical solutions of this application. All other embodiments obtained by a person of ordinary skill in the art based on the embodiments recorded in the document of this application without creative efforts shall fall within the protection scope of the technical solutions of this application.

The following describes some concepts involved in the embodiments of this application.

1. Cloud acceleration: Cloud acceleration is a browser acceleration technology, and Internet access is accelerated by actually accelerating the network speed of a server. Compared to the conventional browser acceleration technology, cloud acceleration substantially increases the network speed. In embodiments of this application, the accelerated cloud network mainly includes two parts: an intelligent routing server and a forwarding node. The intelligent routing server is configured to centrally process state information reported by the forwarding node, and calculate path information of a forwarding path for accessing an external node by each forwarding node. At the same time, forwarding nodes are deployed in the accelerated cloud network all over the world, and are configured to receive an access request from a user and forward data.

For example, when a user in Beijing wants to access an origin station in Guangzhou, the user first sends an access request to a forwarding node in Beijing. The forwarding node in Beijing sends a routing query request to the intelligent routing server if finding that there is no routing information, and forwards data according to routing information in a response message after obtaining the response message.

2. Forwarding node: A forwarding node may be a work station, a customer, a network user, or a personal computer, or may be a server, a printer, or another network connection device. Each work station, server, terminal device, or network device, that is, a device with a unique network address, may be the forwarding node. In an embodiment of this application, a node in the accelerated cloud network may be configured to forward data in the accelerated cloud network.

3. A node outside an accelerated cloud network: A node outside an accelerated cloud network is also referred to as an external node or station, is an origin station accessing an accelerated cloud network in embodiments of this application, and may be a server or another network device. An origin station address is a host address of an origin station of a user. In the embodiments of this application, there are two types of origin station addresses: domain name (there is only one domain name) and network address (there may be multiple network addresses), both of which support ports.

4. Network distance: A network distance is a network transmission distance. In the embodiments of this application, a network distance is determined according to state information, is used to describe a transmission delay, a packet loss rate, load, and other information of nodes in a network, and may be recorded in a routing table. In the network distance in the embodiments of this application, impact of a network delay, a packet loss rate, and load on data forwarding are comprehensively considered. The network distance is mainly used as reference information used by an intelligent routing server to determine path information of a forwarding path, so that the intelligent routing server may perceive a network state in real time and adjust a routing solution.

5. State information: State information is information used to describe a state of a forwarding node in an accelerated cloud network, includes a network delay, a packet loss rate, load, and other information, and may be obtained through probing. In the embodiments of this application, the state information is obtained by a forwarding node through probing, and is mainly divided into two types. One type of state information is state information used to describe a transmission delay between forwarding nodes. The other type of state information is state information used to describe a network distance between a forwarding node and a node outside an accelerated cloud network, and the like.

6. Routing table: A routing table is a table stored in a router or another Internet network device, and stores paths for reaching a specific network terminal. In some cases, a routing table further includes some metrics related to these paths. In the embodiments of this application, an intelligent routing server stores the routing table, and the stored routing table is used to serve a routing query request of each forwarding node. The routing table stores each forwarding node and a first network distance between forwarding nodes. In addition, the routing table may further store a distance between each forwarding node and a node outside an accelerated cloud network.

7. Forwarding path: A forwarding path is a path used by a forwarding node to forward an access request. The forwarding path includes at least one forwarding node. If there are multiple forwarding nodes on the forwarding path, the forwarding path further includes a forwarding order of each forwarding node, that is, an order of forwarding from a forwarding node to a forwarding node and finally forwarding to the target node.

In the embodiments of this application, each forwarding node on the forwarding path has corresponding routing information, that is, a source address, a destination address, a network distance, and the like of each forwarding node, which are collectively referred to as path information of the forwarding path. For a forwarding node A, an address of a next-hop forwarding node B of the forwarding node A is a destination address corresponding to the forwarding node A, and the forwarding node A forwards data to the forwarding node B according to corresponding routing information.

8. Domain name system (DNS): A domain name system is a distributed database in which a domain name and an IP address are mapped to each other on the Internet, and can enable a user to more conveniently access Internet without having to remember an Internet Protocol (IP) number string that can be directly read by a machine. The process of passing a host name and finally getting the IP address corresponding to that host name is called a domain name resolution (or a host name resolution). Only after a DNS server translates a domain name address into an IP address corresponding to the domain name, a target server, that is, the target node can be normally connected.

9. Packet Internet groper (PING): PING is a command in Windows, Unix, and Linux systems. PING is also a communication protocol and is a part of Transmission Control Protocol/Internet Protocol (TCP/IP). The PING command may be used to check whether a network is connected, to help to analyze and determine a network fault.

In a conventional static routing configuration solution, for each domain name of an origin station, a forwarding path for accessing the domain name needs to be manually determined. Besides, there is more than one traffic entry (a first-hop forwarding node) that receives a request of a terminal device. As a result, a different forwarding path needs to be manually specified for each traffic entry, and configuration is very cumbersome.

FIG. 1 is a schematic diagram of a principle of a conventional static routing configuration solution in related technologies. Nodes outside an accelerated cloud network include an external node 1, an external node 2, and an external node 3. Forwarding nodes inside the accelerated cloud network include a forwarding node 1, a forwarding node 2, and a forwarding node 3. There is only one forwarding path to the external node 1, and the forwarding path is the forwarding node 1-→ the forwarding node 2-→ the external node 1. There are two forwarding paths to each of the external node 2 and the external node 3, and the two forwarding paths to each of the external node 2 and the external node 3 are the forwarding node 3-→ the forwarding node 4-→ the node 2 and the forwarding node 5-→ the forwarding node 4-→ the external node 2, and the forwarding node 3-→ the forwarding node 4-→ the external node 3 and the forwarding node 5-→ the forwarding node 4-→ the external node 3. For the external node 2 or the external node 3, the traffic entry includes the forwarding node 3 and the forwarding node 5.

When the forwarding node 1 or the forwarding node 2 becomes faulty, path information of the forwarding path to the external node 1 has a problem. As a result, data cannot be forwarded to the external node 1. Similarly, when the forwarding node 4 becomes faulty, the forwarding paths to the external node 2 and the external node 3 also have a problem. As a result, data cannot be forwarded to the external node 2 or the external node 3.

In other words, when a node becomes faulty in the network, access cannot be normally performed for all access requests that need to pass through the node for forwarding, restricting availability of the network. Moreover, in different time periods, the load status of forwarding nodes in the network and the speed of communication between forwarding nodes also dynamically change. As a result, performance deterioration of some forwarding nodes increases the average access time of all access requests that pass through the forwarding nodes, deteriorating the performance of the accelerated network.

In addition, some forwarding nodes may be updated in the network or added to the network or deleted from the network. The original routing solution is fixed and cannot perceive the dynamic change of the network. As a result, software update and hardware update cannot be synchronized in time, and path information of the forwarding path in the original configuration does not necessarily have the expected performance after hardware is updated. As a result, each time after hardware is updated, the original routing solution needs to be manually adjusted to optimize the performance, which increases labor costs.

Accordingly, embodiments of the present application provide a routing control method and apparatus, an electronic device, and a storage medium. When accessing the target node, a terminal device sends an access request to a forwarding node, where the forwarding node is a traffic entry for accessing the target node through the accelerated cloud network. The forwarding node sends a routing query request to the intelligent routing server, where the routing query request carries address information of the target node. The intelligent routing server determines, according to the address information of the target node, path information of a forwarding path for accessing the target node by each forwarding node. Besides, the intelligent routing server dynamically determines, according to a real-time load status of forwarding nodes in the accelerated cloud network and a communication delay and a packet loss rate between forwarding nodes, path information of a forwarding path for forwarding each access request, and the path information of the forwarding path for reaching the target node does not need to be manually configured in advance, which greatly reduces manual operations. In addition, the intelligent routing server may perceive hardware update in the accelerated cloud network in real time according to state information of the forwarding node, and then may autonomously adjust routing control, thereby synchronizing update of network hardware and software.

In the routing control method provided in the embodiments of this application, the intelligent routing server determines the path information of the forwarding path according to the real-time state information of the forwarding node in the accelerated cloud network in this application, and the path information does not need to be manually preconfigured, which reduces manual operations. Besides, the forwarding path is not a forwarding path specified in advance, and instead is dynamically configured by the intelligent routing server. The forwarding path to the target node may be affected by the status of the forwarding node in the accelerated cloud network and change in different time periods. The path information of the forwarding path determined in the embodiments of this application is more scientific and more applicable to the current network state, so that the accelerated cloud network has a higher capacity and access request processing efficiency is increased. The accelerated cloud network may be fully used to forward the access request, effectively process accidents that occur in real time in the accelerated cloud network, and improve availability of the accelerated cloud network.

The following describes the embodiments of the application with reference to the accompanying drawings of the specification. It is to be understood that the embodiments described herein are merely used for illustrating and explaining this application, but are not intended to limit this application. In addition, the embodiments of this application and features in the embodiments may be mutually combined in a case of no conflict.

Figure 2:
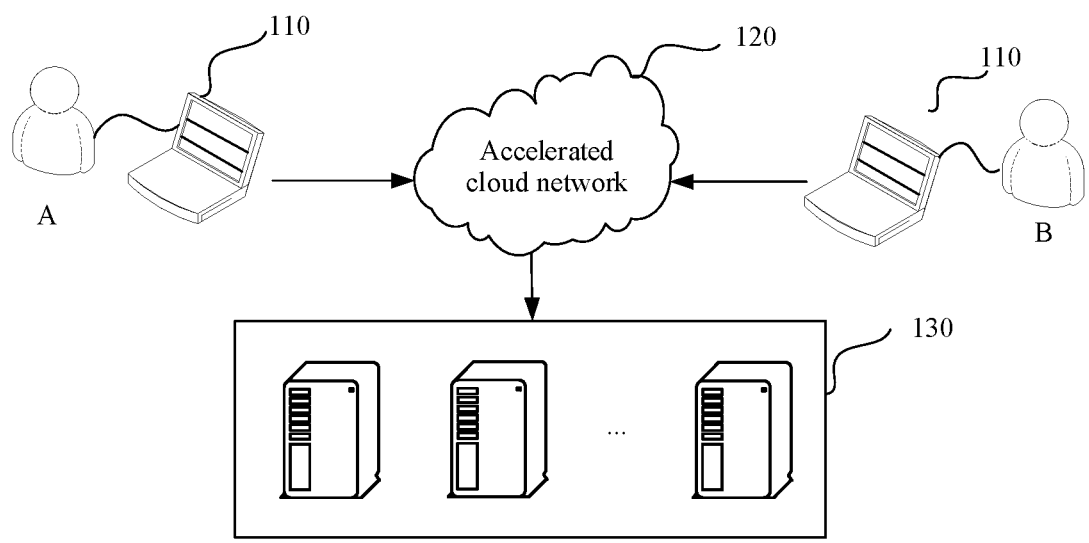
FIG. 2 is a schematic diagram of an application scenario according to an embodiment of this application.

FIG. 2 is a schematic diagram of an application scenario according to an embodiment of the application. The diagram of the application scenario includes two terminal devices 110, an accelerated cloud network 120, and a server 130. The server 130 is a node outside the accelerated cloud network 120, that is, an external node or station. The accelerated cloud network 120 mainly includes two parts: an intelligent routing server and a forwarding node.

When needing to access a target node, a user A or a user B may send an access request to a forwarding node in the accelerated cloud network 120 through the terminal device 110. After receiving the access request, the forwarding node generates a routing query request, and sends the routing query request to the intelligent routing server in the accelerated cloud network 120. After receiving the routing query request, the intelligent routing server queries path information of a forwarding path for forwarding the access request in the accelerated cloud network 120, and delivers the path information to the forwarding node. After receiving the path information of the forwarding path, the forwarding node forwards the access request in the accelerated cloud network 120 according to the path information. The last forwarding node on the forwarding path forwards the access request to the target node in the server 130 outside the accelerated cloud network 120.

Before the terminal device 110 sends the access request to the forwarding node in the accelerated cloud network 120, a DNS server further needs to parse a domain name of the target node.

Specifically, when needing to access the target node, a user first sends the domain name of the target node to a local DNS server through the terminal device 110. Because the domain name needs to access a cloud acceleration service, the local DNS server parses the domain name as a cloud accelerated domain name, and sends the cloud accelerated domain name to the terminal device 110. After receiving the cloud accelerated domain name, the terminal device 110 sends the cloud accelerated domain name to a cloud accelerated DNS server. The cloud accelerated DNS server further parses the cloud accelerated domain name to obtain an entry address of the accelerated cloud network, where the entry address is an address of a first-hop forwarding node for forwarding the access request to the target node through the accelerated cloud network. A traffic entry is the first forwarding node that receives the access request sent by the terminal device 110, that is, the first-hop forwarding node. The terminal device 110 may send the access request to the forwarding node in the accelerated cloud network 120 according to the entry address.

After receiving the routing query request, the intelligent routing server determines, according to state information of the forwarding node in the accelerated cloud network, path information of the forwarding path for forwarding the access request in the accelerated cloud network, and sends the determined path information of the forwarding path to the first-hop forwarding node. The forwarding node forwards the access request to the target node based on the obtained path information.

In the embodiments of this application, the terminal device 110 is an electronic device used by a user, and the electronic device may be a computer device such as a personal computer, a mobile phone, a tablet computer, a notebook, or an e-book reader that has a computing capability and runs instant messaging software and websites or social software and websites. Each terminal device 110 communicates with the server 130 through the accelerated cloud network 120, and the server 130 is one server or a server cluster including several servers, or a cloud computing center, or a virtualized platform. The target node is one or more servers in the server 130, and when the target node corresponds to more network addresses, the server 130 may include servers corresponding to multiple target nodes.

After the forwarding node in the accelerated cloud network 120 forwards the access request of the terminal device 110 to the target node in the server 130 based on the path information of the forwarding path delivered by the intelligent routing server, the target node may forward a response message of the access request to the terminal device 110 based on the path information of the original forwarding path, to implement communication between the terminal device 110 and the server 130.

The following describes in detail main functions of the intelligent routing server and the forwarding node in the routing control method of the embodiments of this application.

Figure 3:
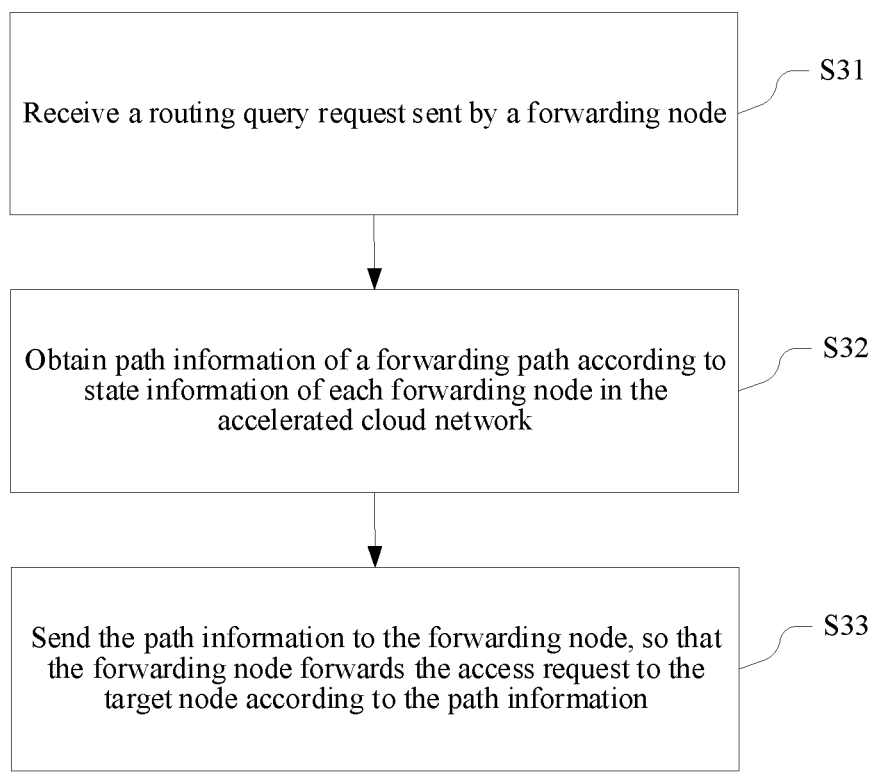
FIG. 3 is a schematic diagram of a routing control method according to an embodiment of this application.

FIG. 3 is a flowchart of an implementation of a routing control method according to an embodiment of this application. The method is applied to an intelligent routing server, and a specific implementation process of this method is as follows:

S31: Receive a routing query request sent by a forwarding node.

The routing query request is generated by the forwarding node according to an access request for a target node from a terminal device 110.

S32: Obtain path information of a forwarding path according to state information of each forwarding node in the accelerated cloud network.

The forwarding path is used to forward the access request in the accelerated cloud network, and the path information of the forwarding path is information such as each forwarding node on the forwarding path and a network address of a target station. A network address may be an IP address.

In the embodiments of this application, the state information of forwarding nodes includes a delay of transmission between forwarding nodes. In addition, the state information of forwarding nodes further includes any one or more of a packet loss rate, load, and the like of the forwarding nodes.

In the embodiments of this application, a delay of transmission between forwarding nodes is mainly used to calculate the shortest forwarding path.

In some embodiments, the intelligent routing server may obtain path information of a corresponding forwarding path according to the state information of forwarding nodes in the accelerated cloud network by querying a routing table.

Specifically, the intelligent routing server queries path information of at least one forwarding path from the forwarding node to the target node from a routing table according to a preconfigured routing policy, where the routing table records an available forwarding node and a first network distance between each two forwarding nodes in the accelerated cloud network, and the first network distance is determined according to state information of the forwarding nodes.

The available forwarding node in the accelerated cloud network changes dynamically. As time passes, when a forwarding node is added to or deleted from the accelerated cloud network, the available forwarding node recorded in the routing table also changes.

For example, a delay of transmission between the forwarding node 1 and the forwarding node 2 is t, the first network distance is 1, a delay of transmission between the forwarding node 1 and the forwarding node 3 is 2t, or the first network distance is 2.

The foregoing embodiment lists a manner of determining the first network distance only based on a transmission delay. In addition, the first network distance may also be determined by comprehensively considering state information such as a transmission delay, a packet loss rate, and load. This is not specifically limited herein.

In the foregoing implementation, the intelligent routing server may query the table to obtain path information of the forwarding path for accessing the target node, which is simple in operation and is highly efficient. The routing table records the available forwarding node in the accelerated cloud network. Therefore, the intelligent routing server may perceive hardware update in the accelerated cloud network in real time, adjust a routing solution in time, synchronize software update, and deliver accurate and reliable path information of the forwarding path to the forwarding node. This avoids that the delivered forwarding path includes a faulty forwarding node, improves availability and performance of the accelerated cloud network, and improves access request processing efficiency.

In some embodiments, the routing table further includes a second network distance between the forwarding node and a node outside the accelerated cloud network, and the second network distance is determined according to state information of the forwarding node and state information of the node outside the accelerated cloud network.

For example, the second network distance between the forwarding node 1 and the external node 1 is 2, and the second network distance between the forwarding node 1 and the external node 2 is 4. The external node is a node outside the accelerated cloud network.

In this manner, the intelligent routing server obtains the path information of the forwarding path mainly according to the routing query request, the state information of forwarding nodes in the accelerated cloud network, and the state information of the node outside the accelerated cloud network.

The state information of the node outside the accelerated cloud network includes a delay of transmission between the forwarding node and the external node. In addition, the state information of the node outside the accelerated cloud network further includes any one or more of a packet loss rate, load, and the like of the external node.

In the embodiments of this application, the load refers to central processing unit (CPU) usage, memory usage, or the like. When the state information includes load, the forwarding node does not need to perform probing and calculation, and the CPU usage, the memory usage, or the like of the forwarding node or the node outside the accelerated cloud network may be directly obtained through monitoring.

In the foregoing implementation, the intelligent routing server may dynamically perceive the real-time state of the network, and dynamically determine the path information of the forwarding path by comprehensively considering a transmission delay, a packet loss rate, and machine load, to achieve the effect of acceleration. In addition, the intelligent routing server may perceive an available external node outside the accelerated cloud network in real time, for example, enable an external node that newly accesses the accelerated cloud network to use an acceleration service as soon as possible when the external node is added.

In some embodiments, the intelligent routing server stores two routing tables, where one routing table is used to serve the routing query request of each forwarding node. After receiving the routing query request, the intelligent routing server determines path information of a corresponding forwarding path mainly by querying the routing table. The other routing table is used to calculate new routing information in real time. After calculation of the routing information is completed, identities of the two routing tables are switched, to dynamically update the routing information. In this way, the latest routing information may be calculated without affecting a normal service, so that the intelligent routing server perceives the network state in real time. After receiving the routing query request, the intelligent routing server may calculate path information of the latest forwarding path based on the latest routing information. In this case, the calculated path information of the forwarding path can adapt to the current state of the accelerated cloud network, and can effectively implement an acceleration service.

In some embodiments, state information of forwarding nodes is reported by each of the forwarding nodes after probing another forwarding node; and a forwarding node probes another forwarding node in the accelerated cloud network, to determine state information of the forwarding node. The state information of the node outside the accelerated cloud network is reported by each forwarding node after probing the node outside the accelerated cloud network; and a forwarding node probes the node outside the accelerated cloud network, to determine state information of the node outside the accelerated cloud network.

The forwarding node may perform a probing task periodically or regularly. After obtaining the state information through probing, the forwarding node may periodically report the state information to the intelligent routing server, or report the state information to the intelligent routing server after receiving an obtaining request from the intelligent routing server. A manner of reporting the state information is not specifically limited in the embodiments of this application.

Figure 4:
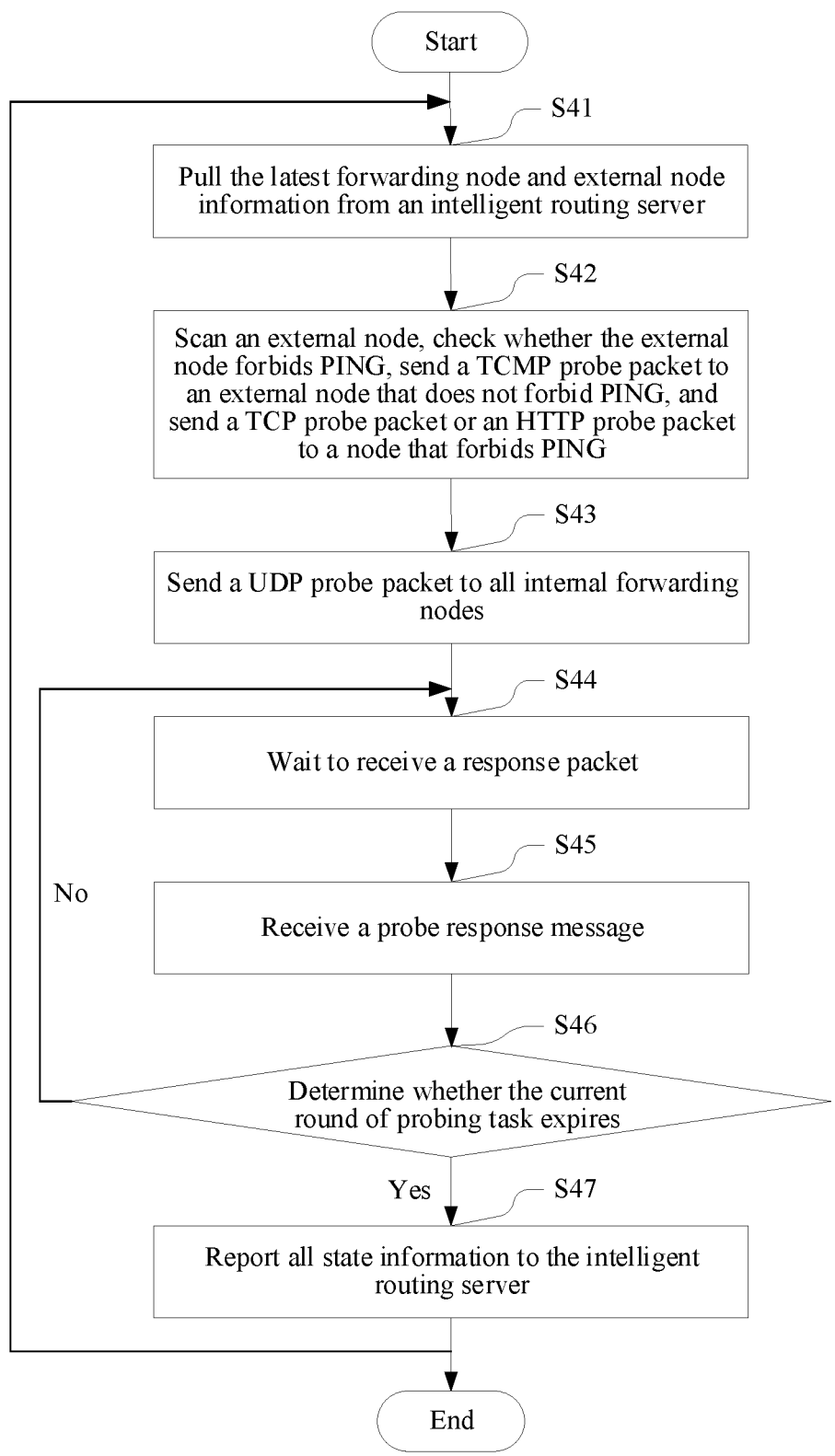
FIG. 4 is a schematic flowchart of performing a probing task by a forwarding node according to an embodiment of this application.

FIG. 4 is a flowchart of performing a probing task by a forwarding node according to an embodiment of this application. The following steps are specifically included:

S41: Pull the latest forwarding node and external node information from an intelligent routing server.

S42: Scan an external node, check whether the external node forbids PING, send a TCMP probe packet to a node that does not forbid PING, and send a TCP probe packet or an HTTP probe packet to a node that forbids PING.

S43: Send a UDP probe packet to all internal forwarding nodes.

S44: Wait to receive a response packet.

S45: Receive a probe response message.

S46: Determine whether the current round of probing task expires; and if yes, perform S47; otherwise, return to perform S44.

S47: Report all state information to the intelligent routing server.

The state information in S47 includes: the state information of each forwarding node, and the state information of the node outside the accelerated cloud network, that is, the state information of the external node.

The latest forwarding node and external node information in S41 is information about an available forwarding node in the accelerated cloud network and an available external node in the accelerated cloud network. The forwarding node regularly obtains the latest forwarding node and external node information from the intelligent routing server, and may determine, based on the information, external nodes and forwarding nodes for which the probing task needs to be performed. In this way, each forwarding node in the network may quickly perceive the change of the forwarding node in the accelerated cloud network and the node outside the accelerated cloud network, to effectively perform the probe task.

Figure 5:
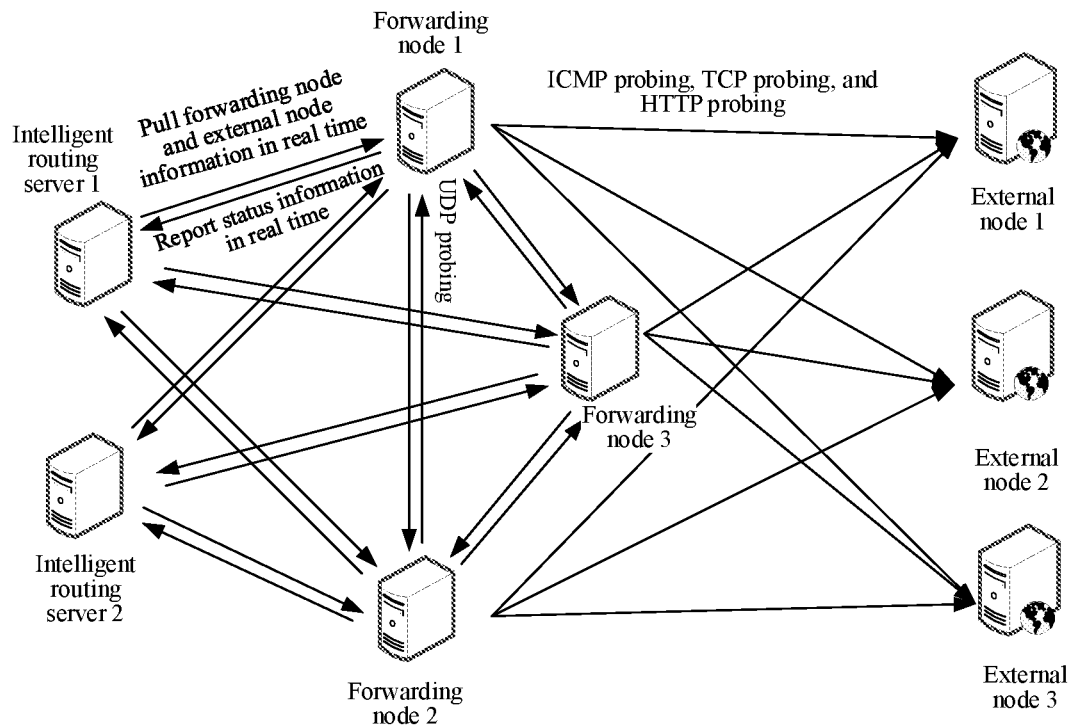
FIG. 5 is a schematic diagram of an entire framework of an accelerated cloud network according to an embodiment of this application.

FIG. 5 is a schematic diagram of an entire architecture of an accelerated cloud network according to an embodiment of this application.

The probing performed by forwarding nodes is UDP probing, any forwarding node may send a UDP probe packet to another forwarding node, and in a process of performing packet probe, first state information is generated according to a probe result.

In some embodiments, the periodic probe task may be performed in the following manner, which is specifically:

Any forwarding node checks a time stamp of state information obtained by probing each another forwarding node. If the state information expires, the forwarding node needs to send a UDP probe packet to the corresponding another forwarding node. If the forwarding node receives no response message for more than a certain period, it is considered that the forwarding node cannot directly reach the forwarding node.

Any forwarding node checks a time stamp of state information obtained by probing each external node. If the state information expires, the forwarding node needs to send a probe packet to the corresponding external node. If the forwarding node receives no response message for more than a certain period, it is considered that the node cannot directly reach the external node. To cope with the case that a source station forbids PING, this solution provides a configurable probe solution, includes ICMP probing, TCP probing, and HTTP probing, and includes probe manners of a network layer, a forwarding layer, and an application layer.

For example, the forwarding node 1 checks a time of previously probing the forwarding node 2, and if the time of previously probing exceeds a threshold, for example, 1 minute, the forwarding node 1 performs probing again. If the time of previously probing does not exceed the threshold, the forwarding node 1 does not need to perform probing.

In the foregoing implementation, the automatic periodic probing is implemented and is simple and efficient.

In addition, probing of the forwarding node and the node outside the accelerated cloud network is implemented through any one or more of Internet control message protocol (ICMP) probing, TCP probing, and HTTP probing.

In some embodiments, if the external node forbids PING, any one or more of a TCP probe packet and an HTTP probe packet is sent to the external node. If the external node permits PING, any one or more of an ICMP probe packet, a TCP probe packet, and an HTTP probe packet is sent to the external node.

For example, the external node 1 forbids PING. When probing the external node 1, forwarding nodes 1, 2, and 3 send a TCP probe packet, where the forwarding nodes 1, 2, and 3 may also send different types of probe packets, for example, the forwarding node 1 sends a TCP probe packet, and the forwarding nodes 2 and 3 send an HTTP probe packet. The external node 2 does not forbid PING, and when probing the external node 2, the forwarding nodes 1, 2, and 3 send an ICMP probe packet.

In the foregoing implementation, a configurable probe solution is provided, includes ICMP probing, TCP probing, and HTTP probing, and includes probe manners of a network layer, a forwarding layer, and an application layer, which can effectively cope with the case that an external node forbids PING.

In addition, the architecture shown in FIG. 5 includes two intelligent routing servers to maintain stability. When one intelligent routing server becomes faulty, the other intelligent routing server can provide a service. A quantity of intelligent routing servers is not specifically limited herein, and may be 1 or 3. However, when there are more intelligent routing servers, the forwarding node needs to send more state information to more intelligent routing servers, which easily causes resource waste.

In the embodiments of this application, the intelligent routing server may determine the available forwarding node in the accelerated cloud network according to the state information reported by each forwarding node.

For example, the intelligent routing server determines the available forwarding node according to a time stamp of the state information reported by the forwarding node. For example, the forwarding node periodically reports the state information. For any forwarding node in the accelerated cloud network, if the forwarding node does not report the latest state information of another forwarding node within the first preset duration, it indicates that the state information reported by the forwarding node stored on the intelligent routing server side is still previously reported state information, and has an earlier time stamp compared with that of the latest reported state information, that is, the forwarding node does not report the latest state information in the latest period. In this case, it indicates that the forwarding node becomes faulty.

In the foregoing implementation, the intelligent router may regularly scan a time stamp of the state information reported by each forwarding node. When state information reported by a forwarding node exceeds the first preset duration, it is considered that the forwarding node cannot normally work, and the forwarding node may be deleted from the routing table, so that the forwarding node may be removed from a process of calculating path information of a forwarding path in the next round, to improve availability of an accelerated service.

In the embodiments of this application, one target node only corresponds to one domain name, but the domain name may correspond to at least one network address. Therefore, the target node may correspond to multiple network addresses. For example, the target node is provided with corresponding servers in different regions, and for servers in different regions, network addresses are different. In other words, when accessing a same domain name at different locations, different users may access different network addresses, but this domain name still remains the same.

In consideration that the routing query request includes at least one network address corresponding to the target node, a routing policy is preconfigured on the intelligent routing server side. When the path information of the forwarding path for forwarding the access request in the accelerated cloud network is queried from the routing table according to the preconfigured routing policy, there may be the following two cases:

Case 1: The routing query request includes one network address corresponding to the target node.

In this case, during obtaining of the path information of the forwarding path, path information of an optimal forwarding path from the forwarding node to the target node only needs to be queried from the routing table.

The path information of the optimal forwarding path in the embodiments of this application is obtained by comprehensively considering a part or all of information such as a transmission delay, load, and a packet loss rate. First, it needs to be ensured that the optimal forwarding path has a short delay, and a path with a shortest delay is selected as the optimal forwarding path. However, when load or a packet loss rate of the forwarding node is high on the path with a shortest delay, a path with a second shortest delay may also be used as the optimal forwarding path.

Case two: The routing query request includes at least two network addresses corresponding to the target node.

In this case, during obtaining of the path information of the forwarding path, the intelligent routing server needs to query path information of a forwarding path of each corresponding network address from the forwarding node to the target node from the routing table. Herein, path information of a forwarding path includes routing information of each node required from a source IP to a destination IP, and includes a distance, an IP address, and the like.

In some embodiments, for any network address corresponding to the target node, there may be one forwarding path to the network address, which is a forwarding path with a shortest delay calculated through a shortest path algorithm, or may be the optimal forwarding path. There may also be multiple forwarding paths to the network address, which include a forwarding path with a shortest delay and a forwarding path with a second shortest delay.

When a target node corresponds to at least two network addresses, there are at least two forwarding paths to the target node. For example, the forwarding path 1 and the forwarding path 2 have the same source IP address and different destination IP addresses, and each of two forwarding paths corresponds to an IP address of the target node. It is assumed that the destination IP of the forwarding path 1 is an IP address 1 and the destination IP of the forwarding path 2 is an IP address 2, and the two forwarding paths are paths with a shortest delay to the IP address 1 and the IP address 2 calculated according to the shortest path algorithm. In addition, a path with a second shortest delay to the IP address 1 may be used as the forwarding path 3, a path with a second shortest delay to the IP address 2 may be used as the forwarding path 4, and so on.

A quantity of queried forwarding paths is related to a preconfigured routing policy, and there may be the following cases depending on routing policies:

Routing Policy 1: Policy of a Path with a Shortest Delay.

In this routing policy, an optimal forwarding path is selected from forwarding paths of all network addresses corresponding to the target node, and path information of the optimal forwarding path is used as the path information of the forwarding path from the forwarding node to the target node and returned to the forwarding node.

The policy of a path with a shortest delay is calculating the optimal forwarding path to the target node according to the shortest path algorithm, where the shortest path algorithm includes the Floyd algorithm, the Dijkstra algorithm, and the like.

For example, the target node 1 corresponds to 3 IP addresses: an IP address A, an IP address B, and an IP address C, which correspond to servers in Beijing, Shanghai, and Tianjin respectively. Assuming that a user initiates an access request for accessing the target node in Tianjin, a destination IP address of a forwarding path determined based on the policy of a path with a shortest delay is the IP address C.

Routing Policy 2: A Policy of Multiple Paths with Weights.

A corresponding weight is set for each forwarding path, and the weight corresponding to each forwarding path is used to indicate a priority that is determined according to a load balancing principle and that is for forwarding the access request through the forwarding path by the forwarding node. If a weight of a forwarding path is larger, it indicates a higher priority for forwarding the access request by the forwarding node according to the forwarding path, and a higher probability of forwarding on the forwarding path.

In this routing policy, path information of forwarding paths of all network addresses corresponding to the target node is used as the path information of the forwarding path from the forwarding node to the target node and returned to the forwarding node, and a corresponding weight is set for a forwarding path of each network address corresponding to the target node.

The target node 1 is still used as an example. Three forwarding paths determined based on the policy of multiple paths with weights are respectively a forwarding path A with a shortest delay whose destination IP address is the IP address A, a forwarding path B with a shortest delay whose destination IP address is the IP address B, and a forwarding path C with a shortest delay whose destination IP address is the IP address C.

Weights of the forwarding path A with a shortest delay, the forwarding path B with a shortest delay, and the forwarding path C with a shortest delay may be determined according to the load balancing principle, to ensure load balancing of the target node of the 3 IP addresses, or may be manually set. For example, the weight of the forwarding path A with a shortest delay is 60%, the weight of the forwarding path B with a shortest delay is 30%, and the weight of the forwarding path C with a shortest delay is 10%.

Routing Policy 3: A Policy of a Primary Path and a Candidate Path.

In this routing policy, at least two forwarding paths are selected from forwarding paths of all network addresses corresponding to the target node, and path information of the selected forwarding paths is used as the path information of the forwarding path from the forwarding node to the target node, where at least one forwarding path is used as a primary forwarding path, and at least one forwarding path is used as a candidate forwarding path.

The target node 1 is still used as an example. It is assumed that two primary forwarding paths and two candidate forwarding paths are determined based on the policy of a primary path and a candidate path. The two primary forwarding paths are the forwarding path C with a shortest delay and a path C' with a second shortest delay whose destination IP addresses are the IP address C. The two candidate forwarding paths are the forwarding path B with a shortest delay whose destination IP address is the IP address B and the forwarding path A with a shortest delay whose destination IP address is the IP address A. Alternatively, Beijing close to Tianjin is selected, and the forwarding path A with a shortest delay and a forwarding path A' with a second shortest delay whose destination IP addresses are the IP address A are used as the candidate forwarding paths, and the like. This is not specifically limited herein.

In the foregoing implementation, the path information of the forwarding path is determined according to different routing policies, which better facilitates load balancing and improves availability of the accelerated service.

The foregoing implementation may be applied to both the manner in which the intelligent routing server queries path information of a forwarding path only based on the state information of each forwarding node, and a manner in which the intelligent routing server queries path information of a forwarding path based on the state information of forwarding nodes and the state information of the node outside the accelerated cloud network. This is not specifically limited herein.

S33: Transmit the path information to the forwarding node, so that the forwarding node forwards the access request to the target node according to the path information.

In the embodiments of this application, after receiving the path information of the forwarding path delivered by the intelligent routing server, the forwarding node forwards the access request based on the path information of the forwarding path.

Figure 6:
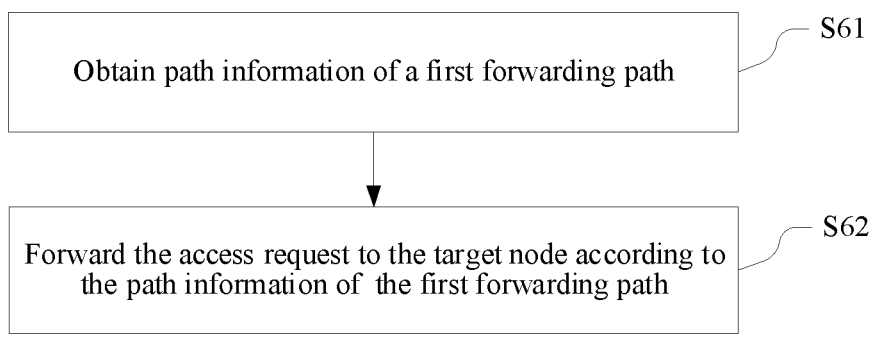
FIG. 6 is a schematic diagram of another routing control method according to an embodiment of this application.

FIG. 6 is a flowchart of an implementation of another routing control method according to an embodiment of this application. The method is applied to a forwarding node, and a specific implementation process of this method is as follows:

S61: Obtain path information of a first forwarding path.

The path information of the first forwarding path is determined by an intelligent routing server according to state information of forwarding nodes in the accelerated cloud network after the intelligent routing server receives a routing query request, and the first forwarding path is used to forward an access request for a target node in the accelerated cloud network.

In some embodiments, the path information of the first forwarding path may also be determined by the intelligent routing server according to state information of forwarding nodes in the accelerated cloud network and state information of a node outside the accelerated cloud network.

For a specific implementation in which the intelligent routing server determines the path information of the first forwarding path according to the state information of each forwarding node in the accelerated cloud network, or according to the state information of each forwarding node in the accelerated cloud network and the state information of the node outside the accelerated cloud network, refer to the foregoing embodiment. Details are not described herein again.

In some embodiments, when forwarding the access request according to the path information of the forwarding path, the forwarding node may package the access request and the received path information of the forwarding path and send the packaged access request and path information to a next-hop forwarding node, so that the next-hop forwarding node directly forwards the access request according to the received path information of the forwarding path, and no longer needs to send the access request to the intelligent routing server again for query, to avoid repeated query of the path information of the forwarding path and improve access request forwarding efficiency.

For example, the first forwarding path is: the forwarding node 1-→ the forwarding node 2-→ the forwarding node 3-→ the target node X. The path information of the first forwarding path includes information such as a next-hop IP address of each forwarding node.

The forwarding node 1 is a first-hop forwarding node, and the forwarding node 3 is a last-hop forwarding node. After receiving the access request, the forwarding node 1 needs to generate the routing query request according to the access request and send the routing query request to the intelligent routing device. After receiving the path information of the first forwarding path delivered by the intelligent routing device, the forwarding node 1 determines that a next-hop forwarding node is the forwarding node 2. In this case, both the path information of the forwarding path and the access request may be sent to the forwarding node 2, so that after receiving the access request and the path information of the forwarding path, the forwarding node 2 directly forwards the access request to the forwarding node 3 according to the path information of the forwarding path, and no longer needs to send the routing query request to the intelligent routing server again.

As can be seen from the foregoing implementation, in the embodiments of this application, the path information that is delivered by the intelligent routing server and that is of the first forwarding path for forwarding the access request of the target node in the accelerated cloud network may be obtained mainly in the following two manners:

Obtaining manner 1: The path information of the first forwarding path directly sent by the intelligent routing server is received, where the routing query request is generated according to the access request after the access request is received.

This manner is applied to the first-hop forwarding node, for example, the forwarding node 1 listed in the foregoing embodiment. Alternatively, this manner is applied to another forwarding node, and a previous-hop forwarding node of this forwarding node does not send the obtained path information of the forwarding path to this forwarding node.

Assuming that the forwarding node 2 in the foregoing embodiment only sends the access request to the forwarding node 3, the forwarding node 3 still needs to send the routing query request to the intelligent routing server.

Obtaining manner 2: The path information of the first forwarding path sent by another forwarding node in the accelerated cloud network is received.

This manner is applied to a forwarding node after the first hop, and a previous-hop forwarding node of this forwarding node sends both the access request and the path information of the forwarding path to this forwarding node, for example, the forwarding node 2 listed in the foregoing embodiment.

In consideration that the intelligent routing server may periodically update the routing table, within a certain time, the path information of the forwarding path for accessing the same target node does not change. Therefore, in some embodiments, after receiving the path information of the forwarding path, the forwarding node may locally buffer the path information of the forwarding path.

In this manner, after receiving the access request and before generating the routing query request according to the access request, the forwarding node further needs to first query whether the valid path information of the second forwarding path is locally buffered.

In the embodiments of this application, the path information of the first forwarding path is the path information of the forwarding path directly delivered by the intelligent routing server after the intelligent routing server receives the access request of the forwarding node. The path information of the second forwarding path is path information of the forwarding path locally buffered in the forwarding node.

In some embodiments, if it is determined that the path information of the second forwarding path for forwarding the access request to the target node in the accelerated cloud network is not locally buffered, it indicates that there is no valid path information of the second forwarding path, and the routing query request still needs to be sent to the intelligent routing server to query the corresponding path information of the second forwarding path.

For example, the forwarding node 1 obtains through query that a second forwarding path is locally buffered: the forwarding node 1-→ the forwarding node 2-→ the forwarding node 3-→ the target node X, and path information of the second forwarding path is previously locally buffered in the forwarding node 1 when a user 1 accesses the target node X. However, the forwarding node 1 receives an access request for accessing the target node Y. In this case, it indicates that the valid path information of the second forwarding path does not exist locally in the forwarding node 1.

In some embodiments, if it is determined that the path information of the second forwarding path for forwarding the access request to the target node in the accelerated cloud network is locally buffered, and the usage duration of the path information of the second forwarding path exceeds the second preset duration, it indicates that there is no valid path information of the second forwarding path, and the routing query request still needs to be sent to the intelligent routing server to query the corresponding path information of the first forwarding path.

For example, the forwarding node 1 obtains through query that a second forwarding path is locally buffered: the forwarding node 1-→ the forwarding node 2-→ the forwarding node 3-→ the target node X, and path information of the second forwarding path is previously locally buffered in the forwarding node 1 when a user 1 accesses the target node X. Although the forwarding node 1 currently receives an access request for accessing the target node X by a user 2 and target nodes are the same, the usage duration of the path information of the forwarding path exceeds the second preset duration. It indicates that the path information of the forwarding path expires, and the state information of the forwarding node may have changed and is no longer suitable for forwarding at this time.

In some embodiments, if it is determined that the path information of the second forwarding path for forwarding the access request to the target node in the accelerated cloud network is locally buffered, and the usage duration of the path information of the second forwarding path does not exceed the second preset duration, it indicates that valid path information of the second forwarding path is locally buffered, and the access request may be forwarded to the target node based on the valid path information of the second forwarding path.

For example, 1 minute ago, the forwarding node 1 receives an access request of a user 1 for accessing the target node X, and obtains the path information of the forwarding path delivered by the intelligent routing server and locally stores the path information. 1 minute later, the forwarding node 1 also receives an access request of a user 2 for accessing the target node X, and locally finds the previously buffered path information of the forwarding path. The usage duration of the path information of the forwarding path does not exceed the second preset duration.

The foregoing implementation is more suitable for a case in which different users access a same target node in the same time period. In this manner, the forwarding node does not need to query from the intelligent routing server each time the access request is received. Therefore, workload of the intelligent routing server is reduced, the load on the network is reduced, and forwarding efficiency is improved.

S62: Forward the access request to the target node according to the path information of the first forwarding path.

In the embodiments of this application, if there is only one first forwarding path, the access request is directly forwarded to the target node through the path information of the first forwarding path.

If there are multiple first forwarding paths, a forwarding path may be selected from the multiple first forwarding paths, and the access request is forwarded according to path information of the selected first forwarding path. There may be specifically the following two selection manners:

Selection manner 1: In a case that corresponding weights are set for the first forwarding paths, a first forwarding path is selected according to the weights corresponding to the first forwarding paths, and the access request is forwarded to the target node according to path information of the selected first forwarding path, where a weight corresponding to each first forwarding path is used to indicate a priority that is determined according to a load balancing principle and that is for forwarding the access request through the first forwarding path by the forwarding node.

For example, there are three first forwarding paths provided with weights: the forwarding path A with a shortest delay with a weight of 60%, the forwarding path B with a shortest delay with a weight of 30%, and the forwarding path C with a shortest delay with a weight of 10%. In this case, the forwarding path A with a shortest delay is selected for forwarding.

Selection manner 2: In a case that the first forwarding path includes at least one primary forwarding path and at least one candidate forwarding path, a primary forwarding path is selected from the at least one primary forwarding path, and the access request is forwarded to the target node according to path information of the selected primary forwarding path.

The selection manners are also suitable for determining multiple valid second forwarding paths, a second forwarding path may be selected in the two selection manners according to weights or the primary status and the candidate status, and the access request is forwarded according to path information of the selected second forwarding path. In addition, if forwarding fails because the selected first forwarding path or second forwarding path cannot be passed through, a forwarding path may be reselected from the remaining first forwarding paths or second forwarding paths for forwarding, until forwarding succeeds. This can ensure that when a target node is accessed, high-speed and stable access experience can be provided to the maximum extent, and a network address with a minimum quantity of routing hops is used as the network address of the accessed target node as much as possible. At the same time, when there are multiple forwarding paths and one forwarding path has a problem, automatic fault switching may be performed, to improve availability of the network and resource usage.

In the embodiments of this application, the forwarding node may probe a specified port in real time, a user sends the access request to ports 80 and 443 of the forwarding node, and a port 8889 is used for forwarding between forwarding nodes in the accelerated cloud network. Therefore, whether the access request is sent by the terminal device or the forwarding node may be determined according to a port number of a port that receives the access request.

In some embodiments, during data forwarding, if any forwarding node receives data forwarded by another forwarding node, the forwarding node first parses to obtain path information of a forwarding path in the data, checks whether a next-hop node is the target node, and if the next-hop node is the target node, removes the path information of the forwarding path and only forwards the access request to the target node. If the next-hop node is still an internal forwarding node, both the path information of the forwarding path and the access request are forwarded to the next-hop node.

In the foregoing implementation, repeatedly querying the intelligent routing server may be effectively avoided.

Figure 7:
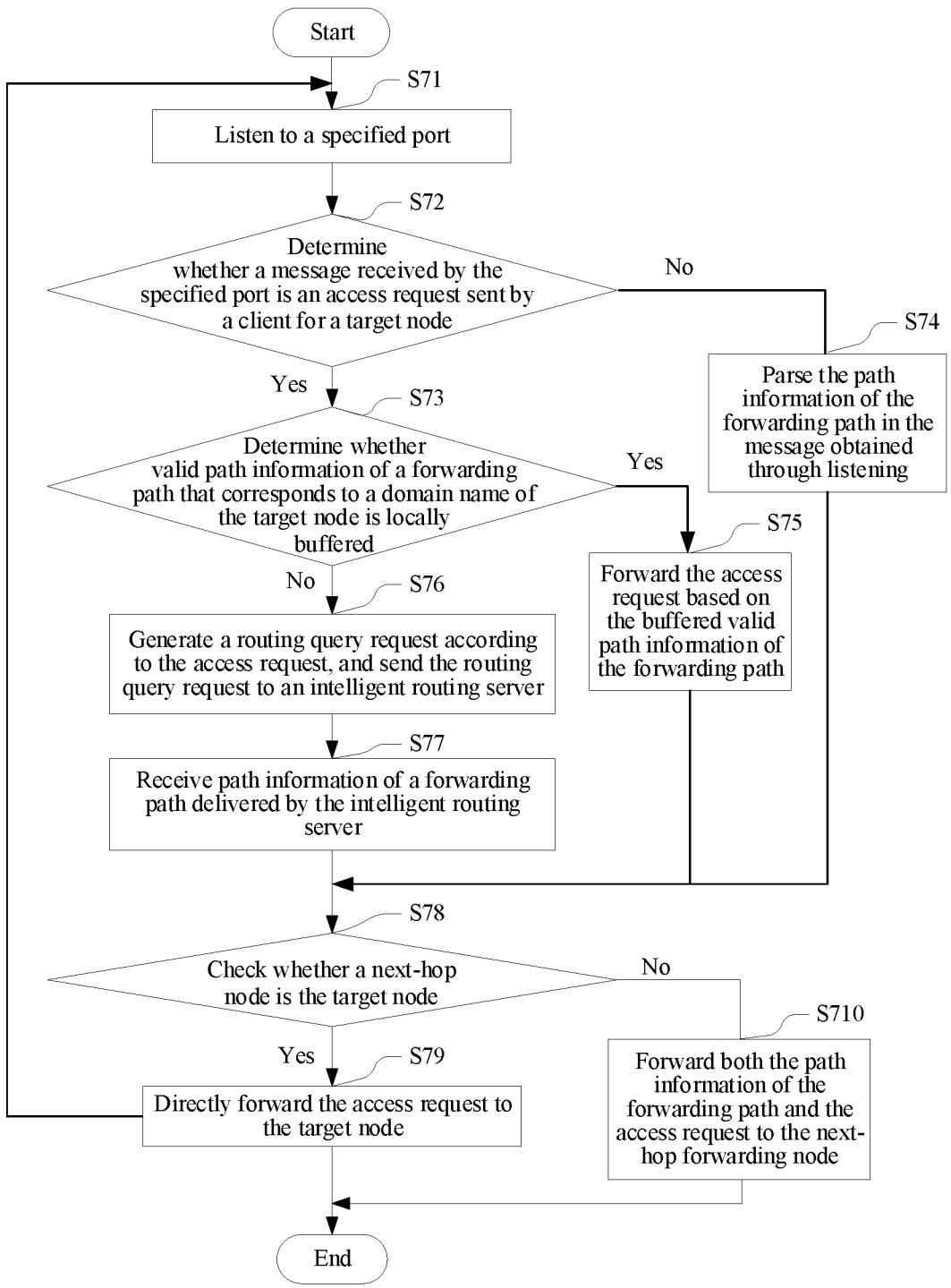
FIG. 7 is a schematic flowchart of forwarding data by a forwarding node according to an embodiment of this application.

FIG. 7 is a flowchart of forwarding data by a forwarding node according to an embodiment of this application. The following steps are specifically included:

S71: Listen to a specified port.

S72: Determine whether a message received by the specified port is an access request sent by a terminal device for a target node; and if yes, perform S73; otherwise, perform S74.

S73: Determine whether valid path information of a forwarding path that corresponds to a domain name of the target node is locally buffered; and if yes, perform S75; otherwise, perform S76.

S74: Parse the path information of the forwarding path in the message obtained through listening.

S75: Forward the access request based on the buffered valid path information of the forwarding path.

S76: Generate a routing query request according to the access request, and send the routing query request to an intelligent routing server.

S77: Receive path information of a forwarding path delivered by the intelligent routing server.

S78: Check whether a next-hop node is the target node; and if yes, perform S79; otherwise, perform S710.

S79: Directly forward the access request to the target node.

S710: Forward both the path information of the forwarding path and the access request to the next-hop forwarding node.

In some embodiments, in the foregoing implementation, only data such as the path information of the forwarding path or the access request is forwarded, and content of data is not cared about. Therefore, data is forwarded by using a short connection, that is, when data needs to be transmitted, a connection is first established, then data is transmitted, and the connection is finally cut off. This forwarding manner brings many processes for establishing and cutting off connections. For path information of a forwarding path with more forwarding nodes, this forwarding manner undoubtedly makes further reduction of an average access delay difficult.

In some embodiments, data of a specified type may be forwarded through a persistent connection. The data of a specified type is audio and video data, game data, data in a handshake process of the HTTPS protocol, or the like.

A persistent connection or a short connection needs to be established in two cases: between the first-hop forwarding node and the terminal device, and between the last-hop forwarding node and the target node. In the embodiments of this application, these two cases are not related. A persistent connection may only be established between the last-hop forwarding node and the target node, or a persistent connection may only be established between the first-hop forwarding node and the target node, or a persistent connection may be established between the last-hop forwarding node and the target node and between the first-hop forwarding node and the target node.

After the persistent connection is established in the foregoing implementation, a subsequent request may reuse the persistent connection. For example, in data transmission in certain scenarios such as game data, HTTP three-way handshake, or audio and videos, data needs to be continuously sent and received. Therefore, multiple requests are generally required. In this case, a persistent connection may be used. A persistent connection is established at the first time of request. Then, the second time of request, the third time of request, and the like may reuse the previously established persistent connection, and the persistent connection does not need to be reestablished, to reduce much time for establishing and cutting off connections.

Figure 8:
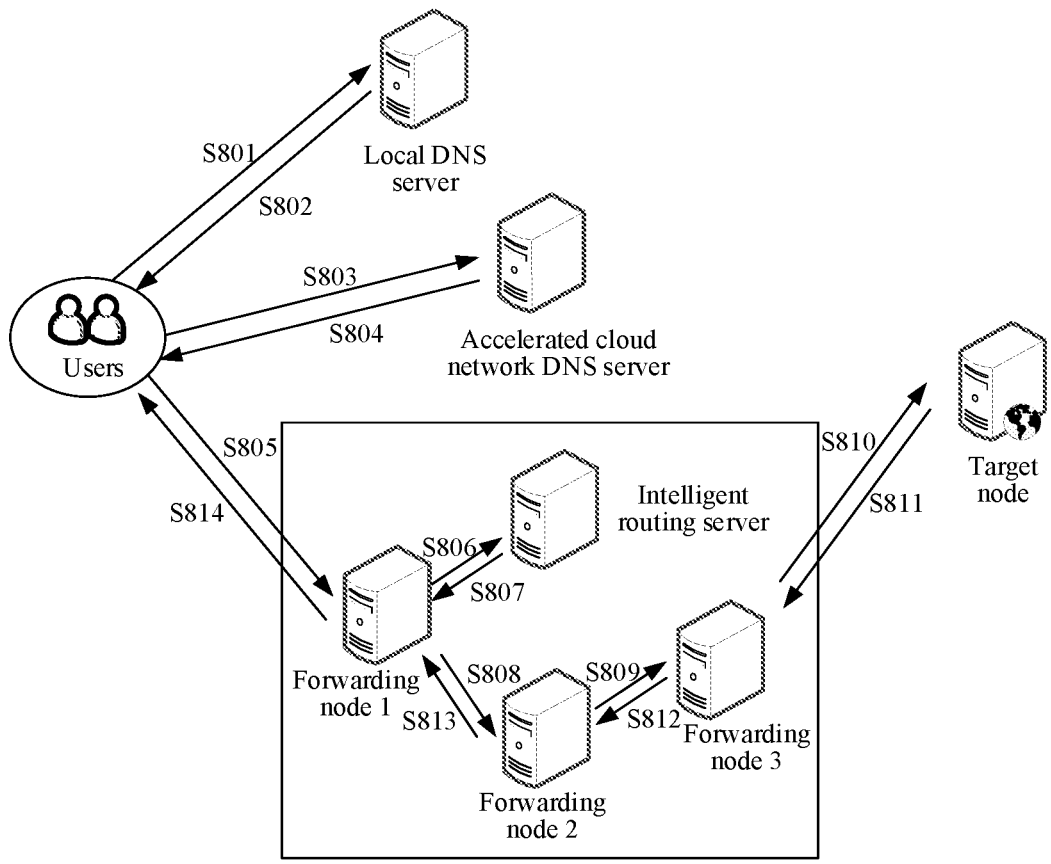
FIG. 8 is a schematic flowchart of a time sequence of interactive implementation according to an embodiment of this application.

FIG. 8 is a diagram of an interaction time sequence of routing control according to an embodiment of this application. A specific implementing process of the method is as follows:

S801: When a user needs to access a target node, trigger a client to send a domain name parsing request to a DNS server, where the request carries a domain name of the target node.

S802: The DNS server parses the domain name as an accelerated domain name of an accelerated cloud network, and sends the accelerated domain name of the accelerated cloud network obtained through parsing to the client.

S803: The client sends the obtained accelerated domain name of the accelerated cloud network to an accelerated cloud DNS server.

S804: The accelerated cloud DNS server parses the accelerated domain name of the accelerated cloud network of the target node, to obtain an entry address of the accelerated cloud network, and sends the entry address to the client.

S805: The client sends the access request for the target node to a forwarding node 1 closest to the user in the accelerated cloud network, where the forwarding node 1 is determined according to the entry address.

S806: The forwarding node 1 sends a routing query request to an intelligent routing server.

S807: The intelligent routing server sends path information of a forwarding path from the forwarding node to the target node to the forwarding node 1. It is assumed that the forwarding path is the forwarding node 1-→ a forwarding node 2-→ a forwarding node 3-→ the target node.

S808: After receiving the path information of the forwarding path, the forwarding node 1 forwards both the path information of the forwarding path and the access request to the forwarding node 2.

S809: The forwarding node 2 identifies that the data is sent by the forwarding node 1, obtains the path information of the forwarding path in the data through parsing, finds that a next-hop node is still an internal forwarding node, and therefore sends both the path information of the forwarding path and the access request to the forwarding node 3.

S810: The forwarding node 3 identifies that the data is sent by the forwarding node 2, obtains the path information of the forwarding path in the data through parsing, finds that a next-hop node is the target node, and therefore removes the path information of the forwarding path and sends forwards the access request to the target node.

S811: After receiving the access request, the target node performs a normal service and sends a response message to the forwarding node 3.

S812: The forwarding node 3 forwards the response message of the target node to the forwarding node 2 according to the path information of the previous forwarding path.

S813: The forwarding node 2 forwards the response message of the target node to the forwarding node 1 according to the path information of the previous forwarding path.

S814: The forwarding node 1 forwards the response message of the target node to the client.

The client may be a terminal device, or may be an application program, a browser, a small program, and so on installed on a terminal device.

In the embodiments of this application, the forwarding node only needs to inform the intelligent routing server of the domain name of the target node and the network address corresponding to the domain name, or inform the intelligent routing server only of the network address corresponding to the domain name. The path information of the forwarding path may be dynamically determined by the intelligent routing server, which may block a faulty forwarding node in the accelerated cloud network and obtain a better acceleration effect. In this way, path information of a forwarding path with a shortest access delay or an optimal forwarding path may be obtained for all access requests accessing the accelerated cloud network.

In addition, it is transparent for the client to use the accelerated cloud network to accelerate the service, the user does not need to change any operation manner, and all access requests may be responded to faster. For a network manager, configuration work is greatly reduced, and a forwarding node with a hardware fault may be automatically blocked, thereby reducing maintenance costs. For the node outside the accelerated cloud network, only simple modification needs to be performed on the DNS server, and a request for accessing the node is parsed to the accelerated cloud DNS server. Therefore, access difficulty is very low, implementation is easy, and costs are low.

Figure 9:
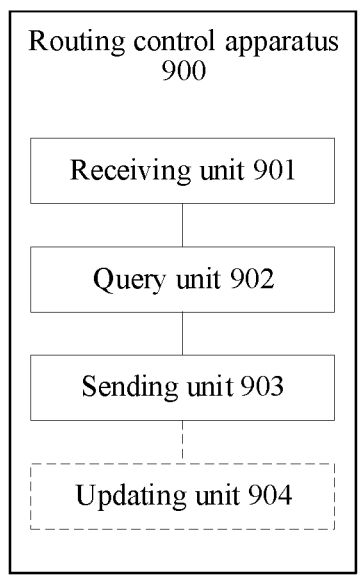
FIG. 9 is a schematic structural composition diagram of an intelligent routing server according to an embodiment of this application.

FIG. 9 is a schematic structural diagram of a first routing control apparatus 900 according to an embodiment of this application. The routing control apparatus 900 is an intelligent routing server and includes:

a receiving unit 901, configured to receive a routing query request sent by a forwarding node, where the routing query request is generated by the forwarding node according to an access request for a target node;

a query unit 902, configured to obtain path information of a forwarding path according to state information of forwarding nodes in the accelerated cloud network, where the forwarding path is used to forward the access request in the accelerated cloud network; and a sending unit 903, configured to transmit the path information to the forwarding node, so that the forwarding node forwards the access request to the target node according to the path information.

In some embodiments, the query unit 902 is further configured to:

query path information of at least one forwarding path from the forwarding node to the target node from a routing table according to a preconfigured routing policy, where the routing table includes an available forwarding node and a first network distance between each two forwarding nodes in the accelerated cloud network, and the first network distance is determined according to state information of the forwarding nodes.

In some embodiments, the routing table further includes a second network distance between the forwarding node and a node outside the accelerated cloud network, and the second network distance is determined according to state information of the forwarding node and state information of the node outside the accelerated cloud network.

In some embodiments, the routing query request includes at least one network address corresponding to the target node, and the query unit 902 is further configured to:

query path information of an optimal forwarding path from the forwarding node to the target node from the routing table when the routing query request includes one network address corresponding to the target node; and query path information of a forwarding path of each corresponding network address from the forwarding node to the target node from the routing table when the routing query request includes at least two network addresses corresponding to the target node.

In some embodiments, the query unit 902 is further configured to:

select an optimal forwarding path from forwarding paths of all network addresses corresponding to the target node, and use path information of the optimal forwarding path as the path information of the forwarding path from the forwarding node to the target node; or use path information of forwarding paths of all network addresses corresponding to the target node as the path information of the forwarding path from the forwarding node to the target node, and set a weight for a forwarding path of each network address corresponding to the target node, where a weight corresponding to each forwarding path is used to indicate a priority that is determined according to a load balancing principle and that is for forwarding the access request through the forwarding path by the forwarding node; or select at least two forwarding paths from forwarding paths of all network addresses corresponding to the target node, and use path information of the selected forwarding paths as the path information of the forwarding path from the forwarding node to the target node, where at least one forwarding path is used as a primary forwarding path, and at least one forwarding path is used as a candidate forwarding path.

In some embodiments, state information of forwarding nodes is reported by each of the forwarding nodes after probing another forwarding node; and the state information of the node outside the accelerated cloud network is reported by each forwarding node after probing the node outside the accelerated cloud network.

In some embodiments, the apparatus further includes:

an updating unit 904, configured to delete a forwarding node that does not report state information of another forwarding node in a first preset duration from the routing table.

Figure 10:
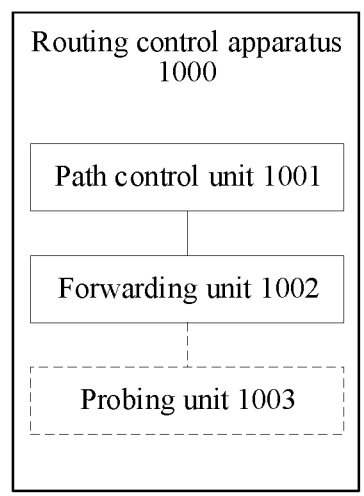
FIG. 10 is a schematic structural composition diagram of a forwarding node according to an embodiment of this application.

FIG. 10 is a schematic structural diagram of a second routing control apparatus 1000 according to an embodiment of the application. The routing control apparatus 1000 is a forwarding node and includes:

a path obtaining unit 1001, configured to obtain path information of a first forwarding path, where the path information of the first forwarding path is determined by an intelligent routing server according to state information of forwarding nodes in the accelerated cloud network after the intelligent routing server receives a routing query request, and the first forwarding path is used to forward an access request for a target node in the accelerated cloud network; and a forwarding unit 1002, configured to forward the access request to the target node according to the path information of the first forwarding path.

In some embodiments, the path information of the first forwarding path is determined by the intelligent routing server according to state information of forwarding nodes in the accelerated cloud network and state information of a node outside the accelerated cloud network.

In some embodiments, the apparatus further includes:

a probing unit 1003, configured to probe another forwarding node in the accelerated cloud network, to determine state information of the forwarding node, and report the state information of the forwarding node to the intelligent routing server, so that the intelligent routing server determines a first network distance between each two forwarding nodes according to the state information of the forwarding node; and probe the node outside the accelerated cloud network, to determine state information of the node outside the accelerated cloud network, and report the state information of the node outside the accelerated cloud network to the intelligent routing server, so that the intelligent routing server determines a second network distance between the forwarding node and the node outside the accelerated cloud network according to the state information of the forwarding node and the state information of the node outside the accelerated cloud network.

In some embodiments, the path obtaining unit 1001 is further configured to:

receive the path information of the first forwarding path directly sent by the intelligent routing server, where the routing query request is generated according to the access request after the access request is received; or receive the path information of the first forwarding path sent by another forwarding node in the accelerated cloud network.

In some embodiments, when the path information of the first forwarding path is directly sent by the intelligent routing server, the path obtaining unit 1001 is further configured to:

after receiving the access request and before generating the routing query request according to the access request, determine path information that is not locally buffered and that is of a second forwarding path for forwarding the access request to the target node in the accelerated cloud network; or determine path information that is locally buffered and that is of a second forwarding path for forwarding the access request to the target node in the accelerated cloud network, where usage duration of the path information of the second forwarding path exceeds a second preset duration.

In some embodiments, the path obtaining unit 1001 is further configured to:

after receiving the access request, in a case of determining that the path information of the second forwarding path for forwarding the access request to the target node in the accelerated cloud network is locally buffered, and the usage duration of the path information of the second forwarding path does not exceed the second preset duration, forward the access request to the target node based on the path information of the second forwarding path.

In some embodiments, when there are at least two first forwarding paths, the forwarding unit 1002 is further configured to:

when corresponding weights are set for the first forwarding paths, select a first forwarding path according to the weights corresponding to the first forwarding paths, and forward the access request to the target node according to path information of the selected first forwarding path, where a weight corresponding to each first forwarding path is used to indicate a priority that is determined according to a load balancing principle and that is for forwarding the access request through the first forwarding path by the forwarding node; and when the first forwarding path includes at least one primary forwarding path and at least one candidate forwarding path, select a primary forwarding path from the at least one primary forwarding path, and forward the access request to the target node according to path information of the selected primary forwarding path.

For ease of description, the foregoing components are respectively described as various modules (or units) divided according to functions. Certainly, during the implementation of this application, the function of the various modules (or units) may be implemented in a same piece of or multiple pieces of software or hardware.

A person skilled in the art can understand that various aspects of this application may be implemented as systems, methods, or computer program products. Therefore, each aspect of this application may be specifically implemented in the following forms, that is, the implementation form of complete hardware, complete software (including firmware and micro code), or a combination of hardware and software, which may be uniformly referred to as "circuit", "module", or "system" herein. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
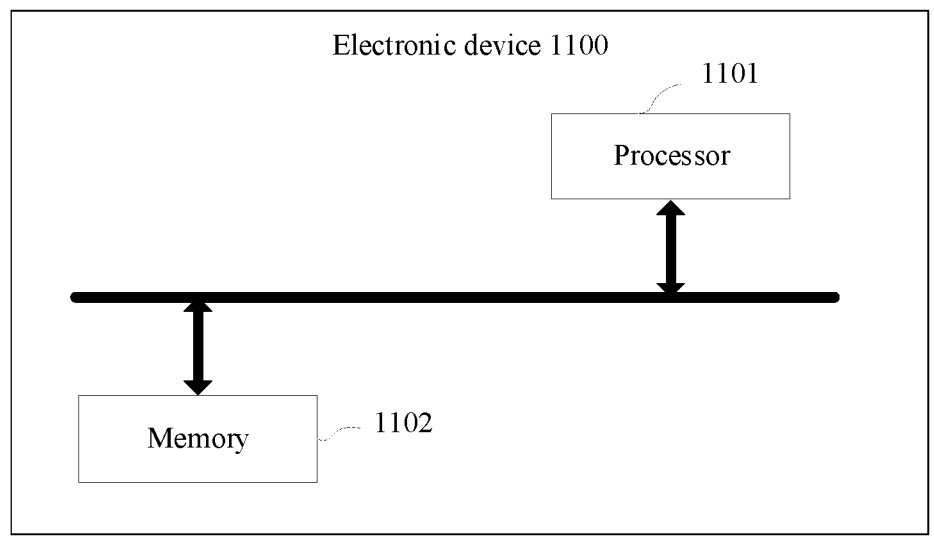
FIG. 11 is a block diagram of an electronic device according to an embodiment of this application.

In some embodiments, an embodiment of this application further provides an electronic device. As shown in FIG. 11, the electronic device 1100 includes at least a processor 1101 and a memory 1102.

The memory 1102 stores computer-executable instructions, and the computer-executable instructions, when executed by the processor 1101, cause the processor 1101 to perform steps of the foregoing routing control method in the exemplary implementations of this application described in this specification. For example, the processor 1101 may perform steps shown in FIG. 3 or FIG. 6.

The embodiments of this application also provide a computing apparatus. In some embodiments, the computing apparatus according to this application may at least include at least one processing unit and at least one storage unit. The storage unit stores computer-executable instructions, and the computer-executable instructions, when executed by the processing unit, cause the processing unit to perform steps of the foregoing routing control method in the exemplary implementations of this application described in this specification. For example, the processing unit may perform steps shown in FIG. 3 or FIG. 6.

Figure 12:
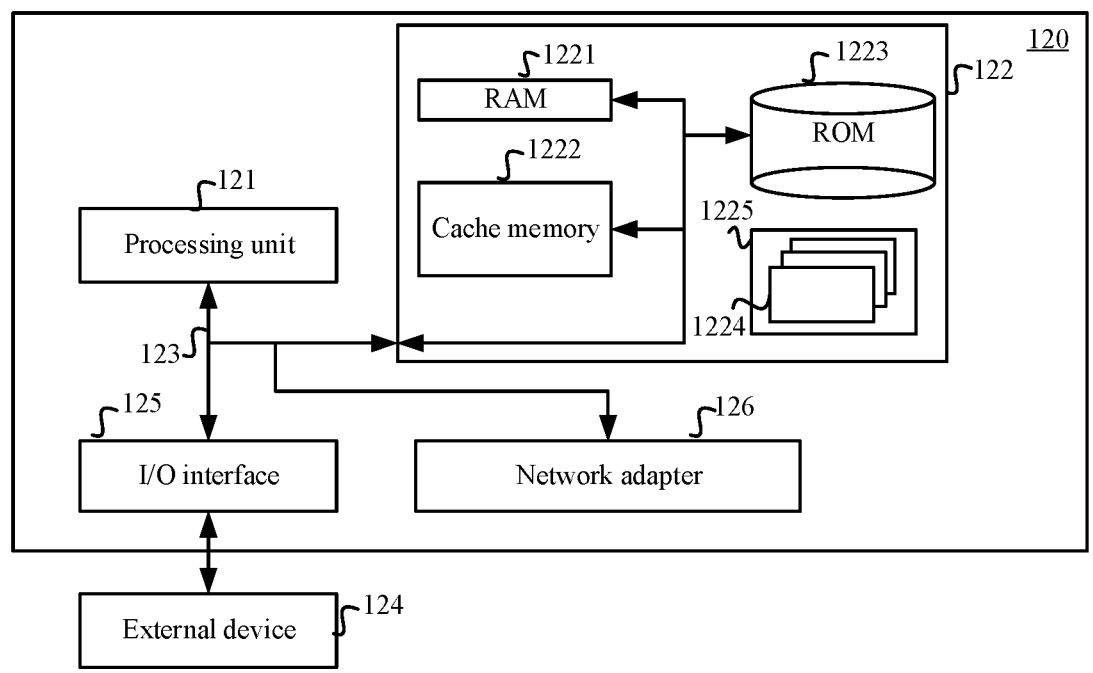
FIG. 12 is a schematic structural composition diagram of hardware of a computing apparatus applied to an embodiment of this application.

FIG. 12 is a schematic diagram of a computing apparatus according to an embodiment of this application. The computing apparatus 120 shown in FIG. 12 is only an example, and does not impose any restriction on functions and scopes of use of the embodiments of this application.

As shown in FIG. 12, the computing apparatus 120 is shown in the form of a general computing apparatus. Components of the computing apparatus 120 may include, but are not limited to, at least one processing unit 121, at least one storage unit 122, and a bus 123 connected to different system components (including the storage unit 122 and the processing unit 121).

The bus 123 represents one or more of several types of bus structures, including a memory bus or a memory controller, a peripheral bus, a processor, or a local bus using any bus structure among various bus structures.

The memory unit 122 may include a readable medium in a form a volatile memory, such as a random access memory (RAM) 1221 and/or a cache memory unit 1222, and may further include a read-only memory (ROM) 1223.

The storage unit 122 may further include a program/utility 1225 having a set of (at least one) program modules 1224. Such a program module 1224 includes, but is not limited to, an operating system, one or more applications, other program modules, and program data. Each or a combination of these examples may include implementation of a network environment.

The computing apparatus 120 may further communicate with one or more external devices 124 (such as a keyboard, a pointing device), and may further communicate with one or more devices that enable a user to interact with the computing apparatus 120, and/or any device (such as a router or a modem) that enables the computing apparatus 120 to communicate with one or more other computing apparatuses. This communication may proceed through an input/output (I/O) interface 125. In addition, the computing apparatus 120 may further communicate with one or more networks, such as a local area network (LAN), a wide area network (WAN), and/or a public network, (such as the Internet) by using a network adapter 126. As shown in the figure, the network adapter 126 communicates with other modules configured to the computing apparatus 120 by using the bus 123. It is to be understood that, although not shown in FIG. 11, other hardware and/or software modules may be used in combination with the computing apparatus 120, including, but not limited to: micro code, a device driver, a redundancy processor, an external disk drive array, a RAID system, a tape drive, a data backup storage system, and the like.

In some possible embodiments, each aspect of the routing control method provided in this application may be further implemented in a form of a program product including a computer-readable instruction. When the program product is run on a computer device, the computer-readable instruction is used for enabling the electronic device to perform steps of the routing control method according to the various exemplary implementations of this application described above in the specification. For example, the electronic device can perform steps shown FIG. 4.

In an embodiment, a computer program product or a computer-readable instruction is provided, the computer program product or the computer-readable instruction includes computer-executable instructions, and the computer-executable instructions are stored in the computer-readable storage medium. The processor of the computer device reads the computer-executable instructions from the computer-readable storage medium, and the processor executes the computer-executable instructions, to cause the computer device to perform the steps in the method embodiments.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The program product used for the routing control method according to an implementation of this application may use a CD-ROM, include computer-executable instructions, and may be run on the computing apparatus. However, the program product of this application is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores a computer-readable instruction. The data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The computer-readable instruction included in the readable medium may be transmitted by using any appropriate medium, including but not limited to, a wireless medium, a wired medium, an optical cable, radio frequency (RF) or the like, or any appropriate combination thereof.

The computer-readable instruction used for executing the operations of this application may be written by using one or more programming languages or a combination thereof. The programming languages include an object-oriented programming language such as Java, C++ and the like, and also include a conventional procedural programming language such as "C" or similar programming languages. Computer-readable instructions may be executed entirely on a computer apparatus of a user, partly on the computer apparatus of the user, as a stand-alone software package, partly on the computer apparatus of the user and partly on a remote computer apparatus, or entirely on the remote computer apparatus or a server. For the case involving a remote computer apparatus, the remote computer apparatus may be connected to a computer apparatus of a user through any type of network including a LAN or a WAN, or may be connected to an external computer apparatus (for example, through the Internet by using an Internet service provider).

Although several units or subunits of the apparatus are mentioned in detailed description above, such division is merely an example but not mandatory. In fact, according to the implementations of this application, features and functions of two or more units described above may be specified in one unit. On the contrary, the features or functions of one unit described above may further be divided and specified by a plurality of units.

In addition, although the operations of the method in this application are described in a specific order in the accompanying drawings. This does not require or imply that the operations have to be performed in the specific order, or all the operations shown have to be performed to achieve an expected result. Additionally or alternatively, some steps may be omitted, and a plurality of steps are combined into one step to be performed, and/or one step is divided into a plurality of steps to be performed.

A person skilled in the art is to understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-executable instructions.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the programmable device, thereby generating computer-implemented processing. Therefore, the instructions executed on the computer or the programmable device provide steps for implementing a specific function in one or more processes in the flowcharts and/or in one or more blocks in the block diagrams.

Although embodiments of this application have been described, once persons skilled in the art know a basic creative concept, they can make other changes and modifications to these embodiments. Therefore, the following claims are intended to be construed as to cover the exemplary embodiments and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A method for routing control performed by a computer device in an accelerated cloud network, the method comprising:
receiving a routing query request sent by one forwarding node in the accelerated cloud network, the routing query request being generated by the forwarding node according to an access request for a target node by a terminal device and including at least two network addresses corresponding to the target node;
obtaining path information of a forwarding path according to state information of forwarding nodes in the accelerated cloud network, the forwarding path being used to forward the access request in the accelerated cloud network, wherein the state information of the forwarding nodes is reported by each of the forwarding nodes after probing another forwarding node in the accelerated cloud network, the obtaining further comprising:
querying path information of a forwarding path of each of the at least two network addresses from the forwarding nodes to the target node from a routing table according to a preconfigured routing policy, wherein the routing table comprises an available forwarding node and a first network distance between each two of the forwarding nodes in the accelerated cloud network, and the first network distance is determined according to the state information of the forwarding nodes; and
transmitting the path information to the forwarding node, wherein the forwarding node is configured to forward the access request to the target node according to the path information.

2. The method according to claim 1, wherein the routing table further comprises a second network distance between the forwarding nodes and a node outside the accelerated cloud network, and the second network distance is determined according to the state information of the forwarding nodes and state information of the node outside the accelerated cloud network.

3. The method according to claim 1, wherein the querying path information of a forwarding path of each of the at least two network addresses from the forwarding nodes to the target node from a routing table according to a preconfigured routing policy further comprises:
selecting an optimal forwarding path from forwarding paths of all network addresses corresponding to the target node, and using path information of the optimal forwarding path as the path information of the forwarding path from the forwarding nodes to the target node;
using path information of forwarding paths of all network addresses corresponding to the target node as the path information of the forwarding path from the forwarding nodes to the target node, and setting a weight for a forwarding path of each network address corresponding to the target node, wherein a weight corresponding to each forwarding path is used to indicate a priority that is determined according to a load balancing principle and that is for forwarding the access request through the forwarding path by one of the forwarding nodes; or
selecting at least two forwarding paths from forwarding paths of all network addresses corresponding to the target node, and using path information of the selected forwarding paths as the path information of the forwarding path from the forwarding nodes to the target node, wherein at least one forwarding path is used as a primary forwarding path, and at least one forwarding path is used as a candidate forwarding path.

4. The method according to claim 2, wherein
the state information of the node outside the accelerated cloud network is reported by each of the forwarding nodes after probing the node outside the accelerated cloud network.

5. A computer device, comprising a memory and one or more processors, the memory storing computer-executable instructions, and the computer-executable instructions, when executed by the one or more processors, causing the computer device to perform a routing control method including:
receiving a routing query request sent by one forwarding node in the accelerated cloud network, the routing query request being generated by the forwarding node according to an access request for a target node by a terminal device and including at least two network addresses corresponding to the target node;
obtaining path information of a forwarding path according to state information of forwarding nodes in the accelerated cloud network, the forwarding path being used to forward the access request in the accelerated cloud network, wherein the state information of the forwarding nodes is reported by each of the forwarding nodes after probing another forwarding node in the accelerated cloud network, the obtaining further comprising:
  querying path information of a forwarding path of each of the at least two network addresses from the forwarding nodes to the target node from a routing table according to a preconfigured routing policy, wherein the routing table comprises an available forwarding node and a first network distance between each two of the forwarding nodes in the accelerated cloud network, and the first network distance is determined according to the state information of the forwarding nodes; and
  transmitting the path information to the forwarding node, wherein the forwarding node is configured to forward the access request to the target node according to the path information.

6. The computer device according to claim 5, wherein the routing table further comprises a second network distance between the forwarding nodes and a node outside the accelerated cloud network, and the second network distance is determined according to the state information of the forwarding nodes and state information of the node outside the accelerated cloud network.

7. The computer device according to claim 5, wherein the querying path information of a forwarding path of each of the at least two network addresses from the forwarding nodes to the target node from a routing table according to a preconfigured routing policy further comprises:
  selecting an optimal forwarding path from forwarding paths of all network addresses corresponding to the target node, and using path information of the optimal forwarding path as the path information of the forwarding path from the forwarding nodes to the target node;
  using path information of forwarding paths of all network addresses corresponding to the target node as the path information of the forwarding path from the forwarding nodes to the target node, and setting a weight for a forwarding path of each network address corresponding to the target node, wherein a weight corresponding to each forwarding path is used to indicate a priority that is determined according to a load balancing principle and that is for forwarding the access request through the forwarding path by one of the forwarding nodes; or
  selecting at least two forwarding paths from forwarding paths of all network addresses corresponding to the target node, and using path information of the selected forwarding paths as the path information of the forwarding path from the forwarding nodes to the target node, wherein at least one forwarding path is used as a primary forwarding path, and at least one forwarding path is used as a candidate forwarding path.

8. The computer device according to claim 6, wherein the state information of the node outside the accelerated cloud network is reported by each of the forwarding nodes after probing the node outside the accelerated cloud network.

9. A non-transitory computer-readable storage medium, storing computer-executable instructions, the computer-executable instructions, when executed by one or more processors of a computer device, causing the computer device to perform a routing control method including:
  receiving a routing query request sent by one forwarding node in the accelerated cloud network, the routing query request being generated by the forwarding node according to an access request for a target node by a terminal device and including at least two network addresses corresponding to the target node;
  obtaining path information of a forwarding path according to state information of forwarding nodes in the accelerated cloud network, the forwarding path being used to forward the access request in the accelerated cloud network, wherein the state information of the forwarding nodes is reported by each of the forwarding nodes after probing another forwarding node in the accelerated cloud network, the obtaining further comprising:
    querying path information of a forwarding path of each of the at least two network addresses from the forwarding nodes to the target node from a routing table according to a preconfigured routing policy, wherein the routing table comprises an available forwarding node and a first network distance between each two of the forwarding nodes in the accelerated cloud network, and the first network distance is determined according to the state information of the forwarding nodes; and
    transmitting the path information to the forwarding node, wherein the forwarding node is configured to forward the access request to the target node according to the path information.

10. The non-transitory computer-readable storage medium according to claim 9, wherein the routing table further comprises a second network distance between the forwarding nodes and a node outside the accelerated cloud network, and the second network distance is determined according to the state information of the forwarding nodes and state information of the node outside the accelerated cloud network.

11. The non-transitory computer-readable storage medium according to claim 9, wherein the querying path information of a forwarding path of each of the at least two network addresses from the forwarding nodes to the target node from a routing table according to a preconfigured routing policy further comprises:
  selecting an optimal forwarding path from forwarding paths of all network addresses corresponding to the target node, and using path information of the optimal forwarding path as the path information of the forwarding path from the forwarding nodes to the target node;
  using path information of forwarding paths of all network addresses corresponding to the target node as the path information of the forwarding path from the forwarding nodes to the target node, and setting a weight for a forwarding path of each network address corresponding to the target node, wherein a weight corresponding to each forwarding path is used to indicate a priority that is determined according to a load balancing principle and that is for forwarding the access request through the forwarding path by one of the forwarding nodes; or
  selecting at least two forwarding paths from forwarding paths of all network addresses corresponding to the target node, and using path information of the selected forwarding paths as the path information of the forwarding path from the forwarding nodes to the target node, wherein at least one forwarding path is used as a primary forwarding path, and at least one forwarding path is used as a candidate forwarding path.

12. The non-transitory computer-readable storage medium according to claim 10, wherein the state information of the node outside the accelerated cloud network is reported by each of the forwarding nodes after probing the node outside the accelerated cloud network.

\* \* \* \* \*